United States Patent [19]

Isobe et al.

[11] Patent Number: 5,560,346

[45] Date of Patent: Oct. 1, 1996

[54] SYSTEM FOR CORRECTING OUTPUT FROM TANK INTERNAL-PRESSURE SENSOR IN EVAPORATIVE FUEL PROCESSING DEVICE

[75] Inventors: Takashi Isobe; Atsushi Kurauchi; Takushi Toda, all of Wako, Japan

[73] Assignee: Honda Giken Kogyo Kabushiki Kaisha, Tokyo, Japan

[21] Appl. No.: 524,903

[22] Filed: Sep. 7, 1995

[30] Foreign Application Priority Data

Sep. 7, 1994 [JP] Japan .................... 6-213446

[51] Int. Cl.$^6$ .................................. F02M 25/08
[52] U.S. Cl. ........................................... 123/519
[58] Field of Search ....................... 123/516, 518, 123/519, 520, 198 D

[56] References Cited

U.S. PATENT DOCUMENTS

| | | | |
|---|---|---|---|
| Re. 35,054 | 10/1995 | Chikamatsu et al. | 123/519 |
| 5,267,547 | 12/1993 | Chikamatsu et al. | 123/518 |
| 5,419,299 | 5/1995 | Fukasawa et al. | 123/520 |
| 5,427,075 | 6/1995 | Yamanaka et al. | 123/520 |
| 5,443,051 | 8/1995 | Otsuka | 123/520 |
| 5,448,980 | 9/1995 | Kawamura et al. | 123/520 |
| 5,460,142 | 10/1995 | Denz et al. | 123/520 |

FOREIGN PATENT DOCUMENTS 5-195896  8/1993  Japan .

*Primary Examiner*—Thomas N. Moulis
*Attorney, Agent, or Firm*—Nikaido, Marmelstein, Murray & Oram LLP

[57] ABSTRACT

A system for correcting an output from a tank internal-pressure sensor in an evaporative fuel processing device including a fuel tank, and a tank internal-pressure sensor provided in the fuel tank or in an evaporative fuel passage between the fuel tank and a pressure regulating valve. In a condition in which it is difficult to generate an evaporative fuel within the fuel tank, a canister opened to the atmosphere and the fuel tank are brought into communication with each other over a predetermined time. A reference value is reset based on a first detection value detected immediately before the communication, a second detection value detected immediately before releasing the communication, and a reference value stored in a reference value storing device. Thus, it is possible to enhance the accuracy of correction of the output from the tank internal-pressure sensor.

5 Claims, 4 Drawing Sheets

SYSTEM FOR CORRECTING OUTPUT FROM TANK INTERNAL-PRESSURE SENSOR IN EVAPORATIVE FUEL PROCESSING DEVICE

BACKGROUND OF THE INVENTION

1. Field of the Invention

The present invention relates to a system for correcting the output of a tank internal-pressure sensor in an evaporative fuel processing device comprising a fuel tank, a canister filled with an adsorbent for adsorbing the evaporative fuel generated in the fuel tank, and a pressure regulating valve provided in an intermediate portion of an evaporative fuel passage connecting the fuel tank and the canister. The pressure regulating valve is opened in response to the pressure in the fuel tank reaching a predetermined pressure. The system also includes a tank internal-pressure sensor provided in the fuel tank or in the evaporative fuel passage between the fuel tank and the pressure regulating valve and means for correcting the output of the sensor.

2. Description of the Prior Art

Systems for correcting the output of a tank internal-pressure sensor are conventionally known, for example, from Japanese Patent Application Laid-Open No. 195896/93. In this known system, the inside of the fuel tank is opened to the atmosphere at a cold start of the engine in which it is difficult to generate an evaporative fuel within the fuel tank, and the output delivered at that time from the tank internal-pressure sensor is set as a reference value.

In this known system, however, the inside of the fuel tank is opened to the atmosphere through the canister at the cold start of the engine and hence, internal pressure in the fuel tank does not completely reach the atmospheric pressure. In the case where the internal pressure in the fuel tank does not completely reach atmospheric pressure, there is a possibility that an error in detection by the tank internal-pressure sensor is increased by using the output from the tank internal-pressure sensor as a reference value.

SUMMARY OF THE INVENTION

Accordingly, it is an object of the present invention to provide a system for correcting the output from the tank internal-pressure sensor in an evaporative fuel processing device, wherein the accuracy of the correction of the output from the tank internal-pressure sensor can be enhanced.

To achieve the above object, according to the present invention, there is provided a system for correcting an output from a tank internal-pressure sensor in an evaporative fuel processing device comprising a fuel tank; a canister filled with an adsorbent for adsorbing an evaporative fuel generated in the fuel tank; a pressure regulating valve provided in an intermediate portion of an evaporative fuel passage connecting the fuel tank and the canister, the valve being opened in response to the pressure in the fuel tank reaching a predetermined pressure; and a tank internal-pressure sensor provided in the fuel tank or in the evaporative fuel passage between the fuel tank and the pressure regulating valve. The system further comprises a forced communication means capable of bringing the fuel tank and the canister which is opened to the atmosphere, into communication with each other over a predetermined time, during a condition in which it is difficult to generate an evaporative fuel within the fuel tank; a reference value storing means for storing a reference value of the tank internal-pressure sensor; and a reference value resetting means for resetting the reference value, based on a first detection value detected by the tank internal-pressure sensor immediately before the communication between the canister and the fuel tank achieved by the forced communication means, a second detection value detected by the tank internal-pressure sensor immediately before releasing of the communication between the canister and the fuel tank achieved by the forced communication means, and the reference value stored in the reference value storing means.

With the above system, it is possible to more accurately determine whether the current reference value of the tank internal-pressure sensor is offset to either a positive or negative pressure side with respect to the reference value stored in the reference value storing means, in response to the detection value detected by the tank internal-pressure sensor being changed with a change in pressure in the fuel tank, which is caused by forcibly bringing the fuel tank and the canister which is opened to the atmosphere, into communication with each other over the predetermined time. On the basis of this determination, the reference value is reset. Thus, it if possible to enhance the accuracy of correction of the output from the tank internal-pressure sensor.

Preferably, the reference value resetting means is adapted to reset the reference value by determining that the second detection value is offset to the negative pressure side, when the second detection value is lower than the reference value stored in the reference storing means in a condition in which the second detection value is less than the first detection value, and to reset the reference value by determining that the second detection value is offset to the positive pressure side, when the second detection value exceeds the reference value stored in the reference storing means in a condition in which the second detection value is equal to or greater than the first detection value.

With the above arrangement, when the second detection value is less than the first detection value, the internal pressure in the fuel tank must be a positive or atmospheric pressure upon opening of the fuel tank to the atmosphere, because the output from the tank internal-pressure sensor has been reduced in response to opening of the fuel tank to the atmosphere through the canister. When the second detection value is less than the reference value, it can be determined that the output from the tank internal-pressure sensor is offset to the negative pressure side. When the second detection value is equal to or greater than the first detection value, the internal pressure in the fuel tank must be a negative or atmospheric pressure upon opening of the fuel tank to the atmosphere, because the output from the tank internal-pressure sensor rises in response to opening of the fuel tank to the atmosphere through the canister. When the second detection value exceeds the reference value, it is possible to determine that the output from the tank internal-pressure sensor is offset to the positive pressure side.

The above and other objects, features and advantages of the invention will become apparent from the following description of preferred embodiment taken in conjunction with the accompanying drawings.

DESCRIPTION OF THE PREFERRED EMBODIMENTS

The present invention will now be described by way of preferred embodiments with reference to the accompanying drawings.

Figure 1:
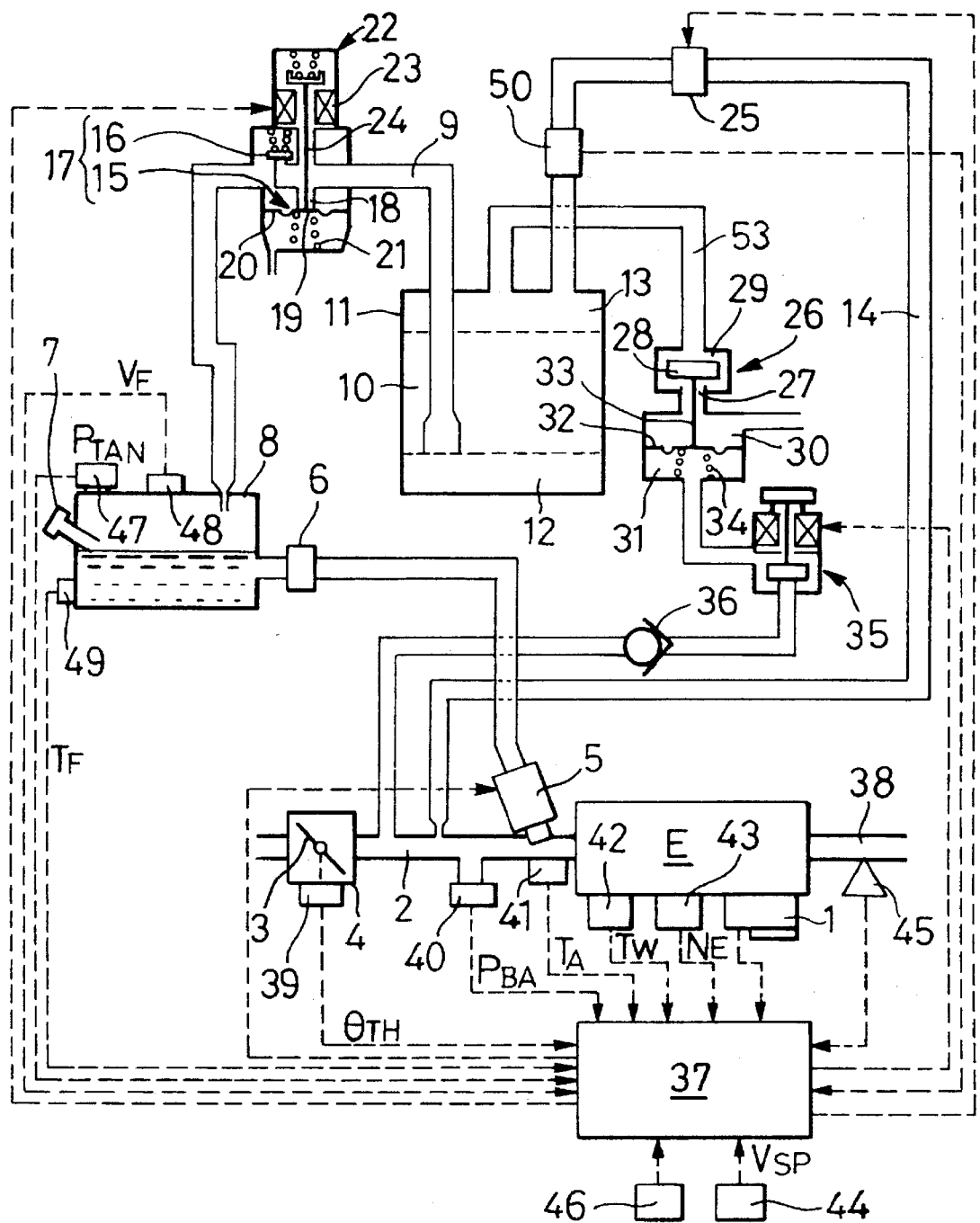
FIG. 1 is a diagrammatic illustration of the arrangement of an evaporative fuel processing device to which a first embodiment of the present invention is applied.

Referring first to FIG. 1 illustrating a first embodiment, the output from an internal combustion engine E is transmitted to a driven wheel (not shown) through a transmission 1. A throttle body 4 including a throttle valve 3 is positioned in an intake passage 2 of the engine E. A fuel injection valve 5 is mounted in the intake passage 2 at a location downstream from the throttle body 4 and is connected to a discharge port in a fuel pump 6 whose intake port is connected to a fuel tank 8 having a filler cap 7 which is opened when fuel is supplied to the tank.

One end of an evaporative fuel passage 9 is connected to an upper portion of the fuel tank 8. A canister 11 is filled with activated carbon 10 serving an adsorbent for adsorbing evaporative fuel, and a first chamber 12 and a second chamber 13 are defined in the canister 11 on opposite ends of the activated carbon filled bed which face the first and second chambers 12 and 13, respectively. The other end of the evaporative fuel passage 9 is connected to the canister 11 opening into the first chamber 12. A purge passage 14 having one end opening into the second chamber 13 and an atmosphere-opening passage 53 are connected to the canister 11. The other end of purge passage 14 is connected to the intake passage 2 at a location between the throttle valve 3 and the fuel injection valve 5.

A two-way valve 17 is positioned in the evaporative fuel passage 9 and serves as a pressure regulating valve. The two-way valve 17 includes a positive pressure valve 15 which is opened to permit the fuel tank 8 and the canister 11 to be put into communication with each other, when the pressure within the fuel tank 8 becomes equal to or greater than a predetermined pressure, and a negative pressure valve 16 which is opened to permit the fuel tank 8 and the canister 11 to be put into communication with each other, when the pressure within the canister 11 becomes greater than the pressure within the fuel tank 8 by a predetermined value or more.

The positive pressure valve 15 includes a diaphragm 20 which has, at its central portion, a valve member 19 capable of closing a valve bore 18 leading to the canister 11. The diaphragm 20 is biased by a spring 21 in a direction to close the valve bore 18 by means of the valve member 19. An electromagnetic driving means 22 which functions as a controlled communication means is connected to the valve member 19 of the positive valve 15. More specifically, the electromagnetic driving means 22 includes a solenoid 23 and a rod 24 which is operated in response to the energization of the solenoid 23. The rod 24 is connected to the valve member 19 of the positive valve 15 in order to forcibly open the positive valve 15 by the operation of the rod 24 in response to the energization of the solenoid 23.

A purge control valve 25 is incorporated in the purge passage 14. An on-off valve 26 is incorporated in the atmosphere-opened passage 53 and includes a valve member 28 which is capable of closing a valve bore 27 and which is openably and closably accommodated in a valve housing 29 leading to the second chamber 13 in the canister 11. The valve member 28 is coupled through a rod 33 with a central portion of a diaphragm 32 which separates an atmosphere chamber 30 and a negative pressure chamber 31 from each other. A spring 34 is positioned in the negative pressure chamber 31 for biasing the diaphragm 32 in a direction to urge the valve member 28 through the rod 33 in a direction to open the valve bore 27. Thus, in a condition in which a negative pressure is not yet introduced into the negative pressure chamber 31, the on-off valve 26 is in its opened state, so that the second chamber 13 is open to the atmosphere through the on-off valve 26. The negative pressure chamber 31 is connected to the intake passage 2 at a location between the throttle valve 3 and the fuel injection valve 5 through an electromagnetic on-off valve 35 and a check valve 36. When the engine is in operation, the electromagnetic on-off valve 35 is opened to introduce a negative pressure into the negative pressure chamber 31, thereby closing the on-off valve 26.

The operations of the fuel injection valve 5, the electromagnetic driving means 22, the purge control valve 25 and the electromagnetic on-off valve 35 are controlled by an electronic control unit 37. Inputted to the electronic control unit 37 are the throttle opening degree $\theta TH$ detected by a throttle opening degree sensor 39 mounted to a throttle body 4; the intake absolute pressure $P_{BA}$ detected by an intake absolute pressure sensor 40 which is mounted in the intake passage 2 at a location downstream from the throttle valve 3; the intake air temperature $T_A$ detected by an intake air temperature sensor 41 which is mounted in the intake passage 2 at a location downstream from the throttle valve 3; the engine water temperature $T_W$ detected by an engine water temperature sensor 42 which is mounted in a cylinder block (not shown) in the internal combustion engine E; the engine revolution-number $N_E$ detected by an engine revolution-number sensor 43 which is disposed around a cam shaft or a crankshaft (not shown) in the internal combustion engine E; the gear shift stage established by the transmission 1; the vehicle speed $V_{SP}$ detected by vehicle speed sensor 44 which is mounted on a wheel (not shown); the oxygen concentration in the exhaust gas that is detected by an oxygen concentration sensor 45 which is mounted in an exhaust passage 38 in the internal combustion engine E; a detection signal from an ignition switch sensor 46 for detecting an ON state of an ignition switch; the tank internal-pressure $P_{TAN}$ detected by a tank internal-pressure sensor 47 which is mounted in the fuel tank 8; the fuel volume $V_F$ detected by a fuel volume sensor 48 which is mounted in the fuel tank 8; the fuel temperature $T_F$ detected by a fuel temperature sensor 49 which is mounted in the fuel tank 8; and the purge flow rate detected by a hot-wire flowmeter 50 which is mounted in the purge passage 14.

The electronic control unit 37 is capable of correcting the output from the tank internal-pressure sensor 47 during a condition in which it is difficult to generate an evaporative fuel within the fuel tank 8, i.e., at a cold start of the internal combustion engine E. When the output is corrected, the operation of the electromagnetic driving means 22 and the electromagnetic on-off valve 35 are controlled, and a detection value detected by the tank internal-pressure sensor 46 is stored, according to a procedure shown in FIG. 2.

Figure 2:
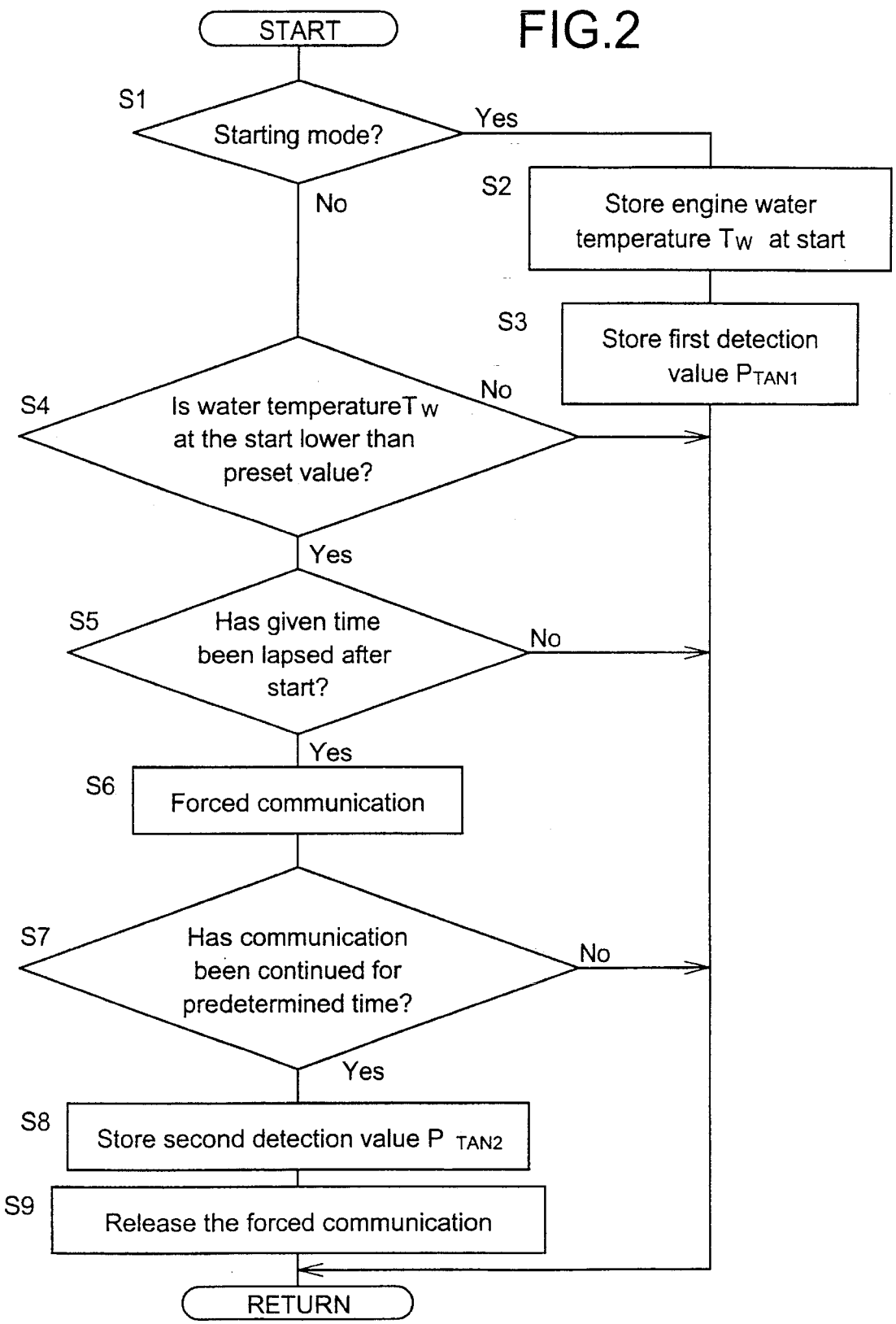
FIG. 2 is a flow chart illustrating a control procedure for correcting an output from a tank internal-pressure sensor.

Referring to FIG. 2, it is determined at Step S1 whether the operational state of the internal combustion engine E is in a starting mode. If the operational state is in the starting mode, the engine water temperature $T_W$ detected by the engine water temperature sensor 42 is stored at Step S2, and the tank internal-pressure detected by the tank internal-pressure sensor 47 is stored as a first detection value $P_{TAN1}$ at Step S3.

If it is determined at Step S1 that the operational state of the internal combustion engine E is not in the starting mode, the processing is advanced to Step S4, at which it is determined whether the engine water temperature $T_W$ at the start which was stored at Step S2, is lower than a preset value. If it is determined that the engine water temperature $T_W$ at the start is lower than the preset value, it is determined at Step S5 whether a given time has been lapsed after the start of the internal combustion engine E.

If it is determined at Step S5 that the given time has lapsed, i.e., when the internal combustion engine E has been brought into a normal operational state after lapse of the given time from its cold start, it is determined that it is difficult to generate an evaporative fuel within the fuel tank, and the processing is advanced from Step S5 and Step S6 to carry out the correction of the output from the tank internal-pressure sensor 47. At Step S6, the canister 11 and the fuel tank 8 are put into communication with each other. More specifically, the fuel tank 8 and the canister 11 in which the second chamber 13 is opened to the atmosphere by closing the electromagnetic on-off valve 35, are put into communication with each other by forcibly opening the positive pressure valve 15 of the two-way valve 17.

When it is confirmed at Step S7 that the forced communication between the fuel tank 8 and the canister 11 has continued for a predetermined time, the tank internal-pressure detected by the tank internal-pressure sensor 47 is stored as a second detection value $P_{TAN2}$ at Step S8, and then, the communication forced by the electromagnetic driving means 22 is released at Step S9.

In other words, in correcting the output from the tank internal-pressure sensor 47, the fuel tank 8 and the canister 11 which is opened to the atmosphere, are forcibly put into communication with each other after the cold start of the internal combustion engine E, and the first detection value $P_{TAN1}$ detected by the tank internal-pressure sensor 47 immediately before the forced communication and the second detection value $P_{TAN2}$ detected by the tank internal-pressure sensor 47 immediately before releasing of the forced communication are stored.

The electronic control unit 37 functions as a reference value storing means for storing a reference value (zero point) $P_{TAN0}$ of the tank internal-pressure sensor 47, and functions as a reference value resetting means for resetting the reference value $P_{TAN0}$, based on the reference value $P_{TAN0}$ stored in the reference value storing means and the first and second detection values $P_{TAN1}$ and $P_{TAN2}$. The reference value $P_{TAN0}$ is reset to correct the output from the tank internal-pressure sensor 47 according to a procedure shown in FIG. 3.

Figure 3:
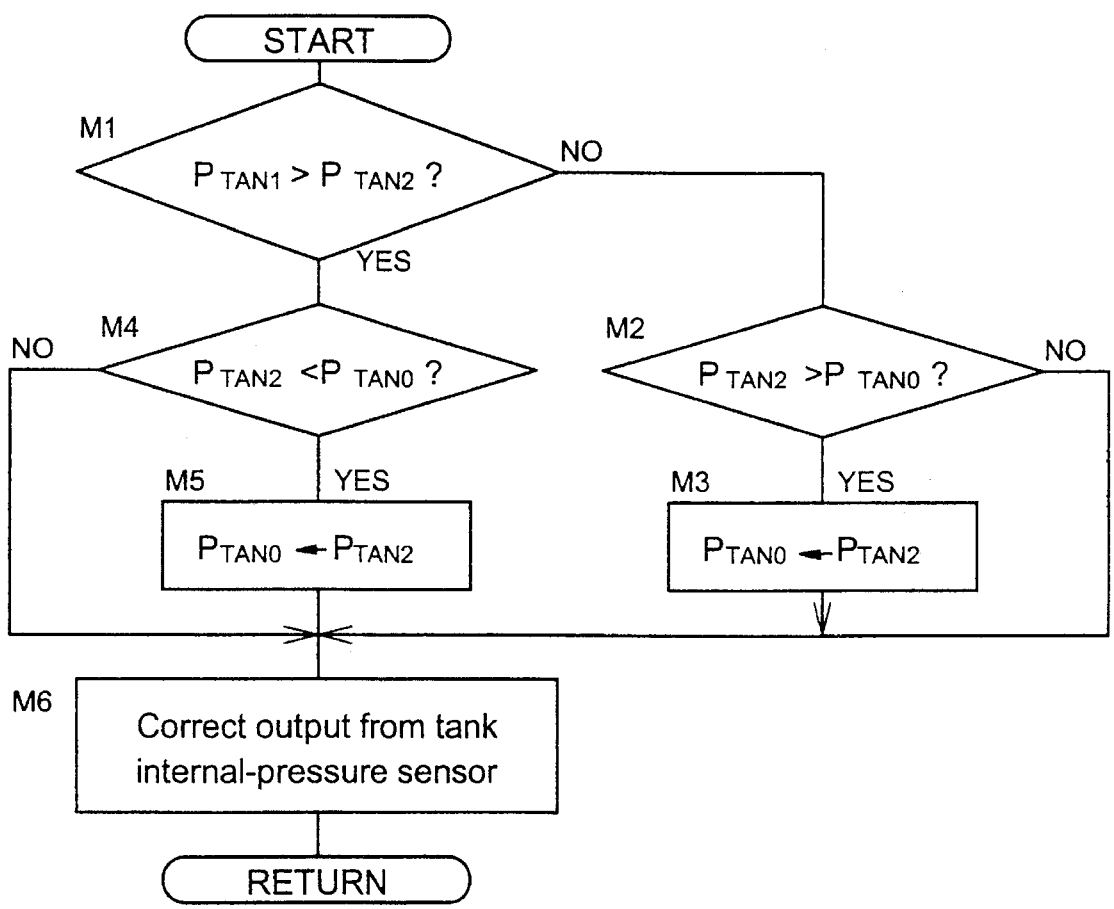
FIG. 3 is a flow chart illustrating an output correcting procedure.

Referring to FIG. 3, when it is determined at Step M1 that the second detection value $P_{TAN2}$ is less than the first detection value $P_{TAN1}$ ($P_{TAN1}>P_{TAN2}$), and when it is determined at Step M2 that the second detection value $P_{TAN2}$ is less than the reference value $P_{TAN0}$, it is determined that the output from the tank internal-pressure sensor 47 is offset to the negative pressure side, and hence, the reference value $P_{TAN0}$ is replaced by the second detection value $P_{TAN2}$ at Step M3. When it is determined at Step M1 that the second detection value $P_{TAN2}$ is equal to or greater than the first detection value $P_{TAN1}$ ($P_{TAN1} \leq P_{TAN2}$), and when it is determined at Step M4 that the second detection value $P_{TAN2}$ exceeds the reference value $P_{TAN0}$, it is determined that the output from the tank internal-pressure sensor 47 is offset to the positive pressure side. Hence, the reference value $P_{TAN0}$ is replaced by the second detection value $P_{TAN2}$ at Step M5. At subsequent Step M6 after Step M3 or M5, the output from the tank internal-pressure sensor 47 is corrected to a value ($P_{TAN}-P_{TAN0}$) resulting from the subtraction of the renewed reference value $P_{TAN0}$ from the detection value $P_{TAN}$.

The operation of the first embodiment will be described below. The inside of the fuel tank 8 is opened to the atmosphere through the canister 11 over a predetermined time. When the second detection value $P_{TAN2}$ detected by the tank internal-pressure sensor 47 immediately before the end of the opening of the fuel tank 8 to the atmosphere over the predetermined time is less than the first detection value $P_{TAN1}$ detected by the tank internal-pressure sensor 47 immediately before the opening of the fuel tank 8 to the atmosphere, i.e., when the output from the tank internal-pressure sensor 47 has been reduced in response to the opening of the fuel tank 8 to the atmosphere, the internal pressure in the fuel tank 8 should have become a positive pressure or atmospheric pressure as a result of the opening of the fuel tank 8 to the atmosphere. Therefore, when the second detection value $P_{TAN2}$ is less than the reference value $P_{TAN0}$ stored theretofore, it can be determined that the output from the tank internal-pressure sensor 47 is offset to the negative pressure side, and the reference value $P_{TAN0}$ is replaced by the second detection value $P_{TAN2}$, thereby correcting the output from the tank internal-pressure sensor 47 by the offset to the negative pressure side into the value ($P_{TAN}-P_{TAN0}$). In this manner, it is possible to more correctly perform the correction of the output from the tank internal-pressure sensor 47.

When the second detection value $P_{TAN2}$ is equal to or greater than the first detection value $P_{TAN1}$, i.e., when the output from the tank internal-pressure sensor 47 has risen in response to the opening of the fuel tank 8 to the atmosphere, the internal pressure in the fuel tank 8 should have become a negative pressure or atmospheric pressure due to the opening of the fuel tank 8 to the atmosphere. Therefore, when the second detection value $P_{TAN2}$ exceeds the reference value $P_{TAN0}$ stored theretofore, it can be determined that the output from the tank internal-pressure sensor 47 is offset to the positive pressure side, and the reference value $P_{TAN0}$ is replaced by the second detection value $P_{TAN2}$, thereby correcting the output from the tank internal-pressure sensor 47 by the offset into the value ($P_{TAN}-P_{TAN0}$). In this manner, it is possible to more correctly perform the correction of the output from the tank internal-pressure sensor 47.

Figure 4:
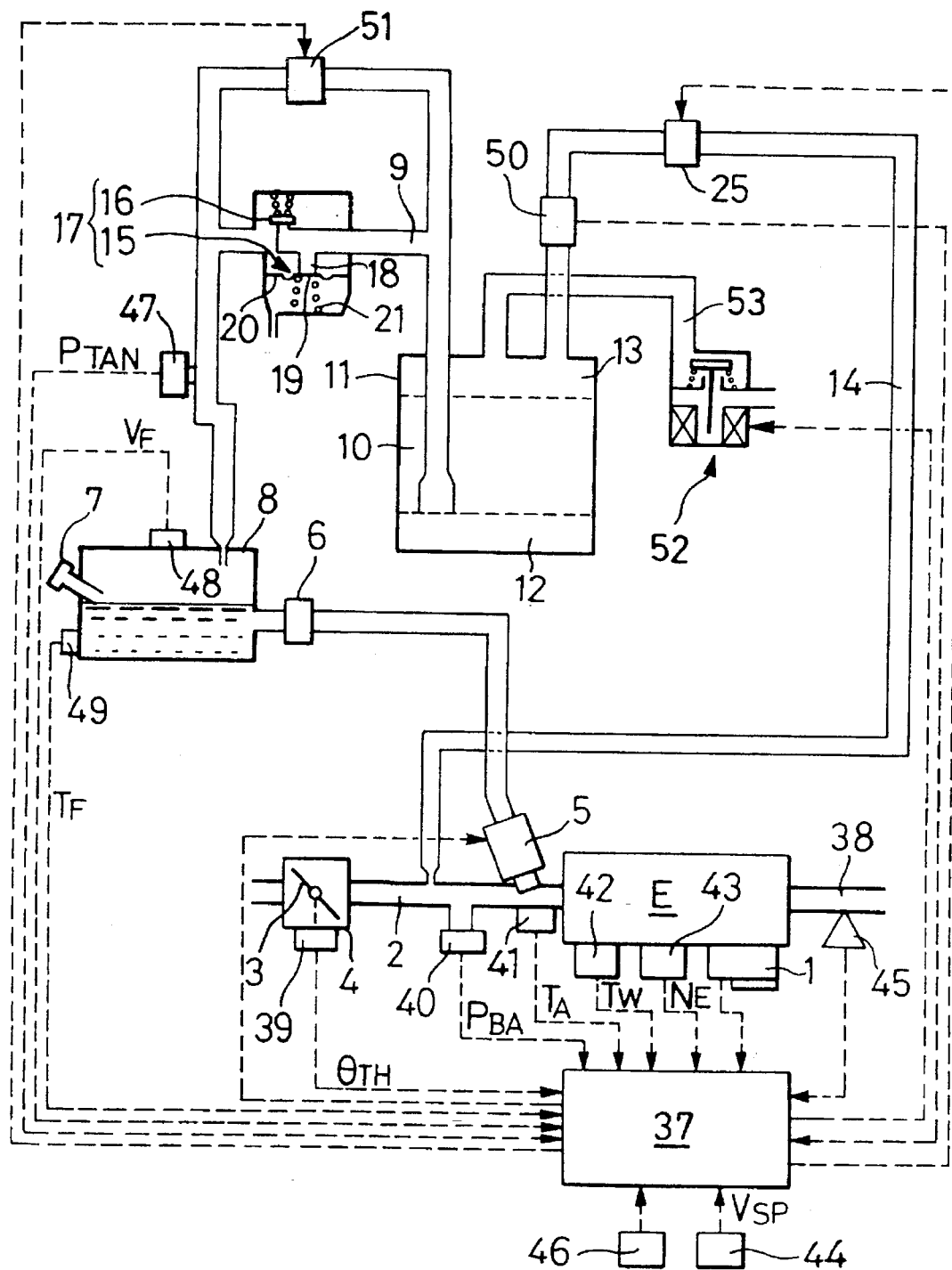
FIG. 4 is a diagrammatic illustration of the arrangement of an evaporative fuel processing device to which a second embodiment of the present invention is applied.

In a second embodiment of the present invention, a bypass valve 51 functioning as a forced communication means may be provided in a bypass passage which is connected to the evaporative fuel passage 9 connecting the fuel tank 8 and the canister 11 so as to bypass the two-way valve 17 incorporated in the evaporative fuel passage 9, as shown in FIG. 4. Thus, the fuel tank 8 and the canister 11 may be placed into communication with each other by controlling the opening of the bypass valve 51 by means of the electronic control unit 37. A tank internal-pressure sensor 47 may be provided in the evaporative fuel passage 9 between the pressure regulating two-way valve 17 and the fuel tank 8. Further, a normally-open electromagnetic on-off valve 52 controlled by the electronic control unit 37 may be provided in the atmosphere-opened passage 15 connected to the canister 11.

Although the embodiments of the present invention have been described in detail, it will be understood that the present invention is not limited to the above-described embodiments, and various modifications in design may be made without departing from the spirit and scope of the invention defined in the claims.

We claim:

1. A system for correcting an output of a tank internal-pressure sensor in an evaporative fuel processing device comprising a fuel tank; a canister filled with an adsorbent for adsorbing an evaporative fuel generated in said fuel tank; an evaporative fuel passage connecting said fuel tank and said canister; a pressure regulating valve positioned in an intermediate portion of said evaporative fuel passage, wherein said evaporative fuel passage is opened in response to the pressure in said fuel tank reaching a predetermined pressure; and a tank internal-pressure sensor for detecting the internal pressure in said fuel tank; means for communicating said canister with the atmosphere; a forced communication means for bringing said fuel tank and said canister into communication with each other over a predetermined time in a condition in which it is difficult to generate an evaporative fuel within said fuel tank; a reference value storing means for storing a reference value of said tank internal-pressure sensor; and a reference value resetting means for resetting the reference value, based upon a first detection value detected by said tank internal-pressure sensor immediately before the establishment of communication between said canister and said fuel tank by said forced communication means, a second detection value detected by said tank internal-pressure sensor immediately before the releasing of the communication between said canister and said fuel tank by said forced communication means, and the reference value stored in said reference value storing means.

2. A system for correcting an output of a tank internal-pressure sensor in an evaporative fuel processing device according to claim 1, wherein when the second detection value is less than the reference value stored in said reference storing means in a condition in which the second detection value is less than the first detection value, said reference value resetting means determines that the output from the tank internal-pressure sensor is offset to a negative pressure side and resets the reference value, and when the second detection value exceeds the reference value stored in said reference storing means in a condition in which the second detection value is equal to or greater than the first detection value, said reference value resetting means determines that the output from the tank internal-pressure sensor is offset to a positive pressure side and resets the reference value.

3. A system for correcting an output of a tank internal-pressure sensor as set forth in claim 1, wherein said internal-pressure sensor is positioned in said fuel tank.

4. A system for correcting an output of a tank internal-pressure sensor as set forth in claim 1, wherein said internal-pressure sensor is positioned in said evaporative fuel passage.

5. A system for correcting an output of a tank internal-pressure sensor as set forth in claim 4, further including a bypass passage for bypassing said forced communication means and a valve means for opening and closing said bypass passage as a function of engine conditions.

* * * * *